US010083350B2

(12) United States Patent
Dimitriadis et al.

(10) Patent No.: US 10,083,350 B2
(45) Date of Patent: *Sep. 25, 2018

(54) SENSOR ENHANCED SPEECH RECOGNITION

(71) Applicant: AT&T Intellectual Property I, L.P., Atlanta, GA (US)

(72) Inventors: Dimitrios Dimitriadis, Rutherford, NJ (US); Donald J. Bowen, Madison, NJ (US); Mazin E. Gilbert, Warren, NJ (US); Horst J. Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,546

(22) Filed: Jan. 11, 2018

(65) Prior Publication Data

US 2018/0137348 A1    May 17, 2018

Related U.S. Application Data

(63) Continuation of application No. 14/302,137, filed on Jun. 11, 2014, now Pat. No. 9,870,500.

(51) Int. Cl.
*G10L 15/25* (2013.01)
*G06K 9/00* (2006.01)
(Continued)

(52) U.S. Cl.
CPC ..... *G06K 9/00335* (2013.01); *G06K 9/00664* (2013.01); *G10L 15/065* (2013.01); *G10L 2015/227* (2013.01); *G10L 2015/228* (2013.01)

(58) Field of Classification Search
CPC .............. G06K 9/00335; G10L 15/065; G10L 2015/228; G10L 2015/227
(Continued)

(56) References Cited

U.S. PATENT DOCUMENTS 6,185,529 B1   2/2001   Chen et al.
6,594,629 B1   7/2003   Basu et al.
(Continued)

FOREIGN PATENT DOCUMENTS

EP         2477398      7/2012
KR       20100066083    6/2010
(Continued)

*Primary Examiner* — Edwin S Leland, III
(74) *Attorney, Agent, or Firm* — Akerman LLP; Michael K. Dixon; Mammen (Roy) P. Zachariah, Jr.

(57) ABSTRACT

A system for sensor enhanced speech recognition is disclosed. The system may obtain visual content or other content associated with a user and an environment of the user. Additionally, the system may obtain, from the visual content, metadata associated with the user and the environment of the user. The system may also include determining, based on the visual content and metadata, if the user is speaking. If the user is determined to be speaking, the system may obtain audio content associated with the user and the environment. The system may then adapt, based on the visual content, audio content, and metadata, one or more acoustic models that match the user and the environment. Once the one or more acoustic models are adapted and loaded, the system may enhance a speech recognition process or other process associated with the user.

21 Claims, 5 Drawing Sheets

(51) Int. Cl.
*G10L 15/065* (2013.01)
*G10L 15/22* (2006.01)

(58) Field of Classification Search
USPC .......................................................... 704/231
See application file for complete search history.

(56) References Cited

U.S. PATENT DOCUMENTS

| | | | |
|---|---|---|---|
| 6,754,373 B1 | 6/2004 | De et al. | |
| 6,996,525 B2 | 2/2006 | Bennett et al. | |
| 7,246,058 B2 | 7/2007 | Burnett | |
| 7,676,369 B2 | 3/2010 | Fujimoto et al. | |
| 7,881,493 B1* | 2/2011 | Edwards | G06K 9/00597 |
| | | | 348/78 |
| 8,489,115 B2 | 7/2013 | Rodriguez et al. | |
| 8,521,007 B2 | 8/2013 | Kashiwagi et al. | |
| 8,635,066 B2* | 1/2014 | Morrison | G06K 9/00221 |
| | | | 704/231 |
| 8,660,842 B2* | 2/2014 | Raux | G10L 15/07 |
| | | | 704/211 |
| 9,042,605 B2* | 5/2015 | Gossweiler | G01C 11/04 |
| | | | 382/106 |
| 9,074,887 B2* | 7/2015 | Hsieh | G06T 7/73 |
| 9,111,522 B1* | 8/2015 | Worley, III | G10K 11/16 |
| 9,160,404 B2* | 10/2015 | Togawa | H04B 3/20 |
| 2002/0116197 A1 | 8/2002 | Erten | |
| 2006/0104483 A1* | 5/2006 | Harel | G07C 9/00158 |
| | | | 382/115 |
| 2006/0224382 A1* | 10/2006 | Taneda | G10L 15/25 |
| | | | 704/233 |
| 2010/0063820 A1 | 3/2010 | Seshadri | |
| 2011/0098056 A1* | 4/2011 | Rhoads | G01C 21/20 |
| | | | 455/456.1 |
| 2011/0221671 A1 | 9/2011 | King et al. | |
| 2011/0295603 A1 | 12/2011 | Meisel et al. | |
| 2014/0218371 A1* | 8/2014 | Du | G06T 13/80 |
| | | | 345/473 |
| 2014/0334644 A1* | 11/2014 | Selig | H03G 5/165 |
| | | | 381/108 |
| 2014/0350924 A1* | 11/2014 | Zurek | G10L 15/22 |
| | | | 704/231 |
| 2015/0161227 A1* | 6/2015 | Buryak | G06F 9/454 |
| | | | 707/738 |
| 2015/0249584 A1* | 9/2015 | Cherifi | H04L 43/065 |
| | | | 709/224 |
| 2015/0364139 A1* | 12/2015 | Dimitriadis | G06K 9/00335 |
| | | | 704/231 |
| 2015/0365759 A1* | 12/2015 | Dimitriadis | G06K 9/00684 |
| | | | 381/71.1 |
| 2015/0379752 A1* | 12/2015 | Li | G06T 13/40 |
| | | | 715/752 |
| 2016/0149547 A1* | 5/2016 | Rider | H03G 3/04 |
| | | | 381/57 |
| 2016/0321356 A1* | 11/2016 | Tsoref | G06F 17/30702 |
| 2016/0329048 A1* | 11/2016 | Li | G10L 15/005 |

FOREIGN PATENT DOCUMENTS

| | | |
|---|---|---|
| WO | 2007114346 | 10/2007 |
| WO | 2011109083 | 9/2011 |

* cited by examiner

SENSOR ENHANCED SPEECH RECOGNITION

CROSS-REFERENCE TO RELATED APPLICATION

This application is a continuation of and claims priority to U.S. patent application Ser. No. 14/302,137, filed Jun. 11, 2014, which is hereby incorporated by reference in its entirety.

FIELD OF THE INVENTION

The present application relates to technologies for visual sensing, speech recognition, speech enhancement, and acoustics, and more particularly, to a system for sensor enhanced speech recognition.

BACKGROUND

Currently, people use various types of devices to communicate with each other and to communicate with various computer systems. For example, people often utilize smartphones, tablets, phablets, computers, and other technologies to make telephone calls, access various types of internet services, access speech recognition systems, perform a variety of tasks and functions, or a combination thereof. The widespread adoption of such devices in various types of environments has often increased the difficulties associated with automatic speech recognition and other similar technologies. For example, when a user is using a smartphone application that has automatic speech recognition features, the user may be located in a noisy environment. The noisy environment may include other users, devices, machinery, or other things that make noises in the environment that may interfere with the automatic speech recognition processes executing on the smartphone application of the user. In particular, a noisy environment may degrade the performance of such automatic speech recognition processes and may ultimately interfere with the user's successful use of the application.

Currently, in order to lessen the effects of such environmental noises, various technologies have been utilized to separate a selected user's audio signals from the audio signals made by interferers in the environment. However, such technologies typically require the locations of the noise sources to be predefined to lessen such effects. Furthermore, current technologies fail to use the appropriate statistical automatic speech recognition models, and fail to use knowledge associated with the user, the environment, or objects in the environment when attempting to counteract such effects. Moreover, current technologies often require substantial amounts of time to implement, often require significant amounts of resources, and often provide an inefficient and ineffective means for amplifying speech recognition processes or other similar processes.

SUMMARY

Systems and accompanying methods for sensor enhanced speech recognition are disclosed. In particular, the systems and methods may use metadata obtained from visual, audio, or other content associated with a user and an environment of the user to adapt acoustic models that are used for enhancing speech recognition processes or other processes associated with the user. In order to do so, the systems and methods may utilize visual sensors, cameras, audio sensors, or other similar devices to capture visual, audio, or other content associated with the user and the user's environment. The captured content and metadata associated with the content may be utilized to determine a distance between the user and a device that the user is using, the user's orientation with respect to the device of the user, a gender of the user, an age of the user, a location of the user, a velocity of the user, or other information associated with the user. Additionally, the captured content, metadata associated with the content, or a combination thereof, may be utilized by the systems and methods to determine if the user is speaking or otherwise making sounds.

If the user is determined to be speaking or making sounds, the systems and methods may include obtaining audio content associated with the user and the environment. Based on the visual content, audio content, metadata, or a combination thereof, the systems and methods may include adapting and loading one or more acoustic models that correspond to the user and to the environment of the user. The systems and methods may utilize the loaded acoustic models to enhance a speech recognition process or other process associated with the user. As a result, the systems and methods may ensure an optimal matching between audio conditions occurring in the user's environment with the appropriate acoustic models so as to improve speech recognition processes or other selected processes.

In one embodiment, a system for sensor enhanced speech recognition is disclosed. The system may include a memory that stores instructions and a processor that executes the instructions to perform various operations of the system. The system may perform an operation that includes obtaining visual content associated with a user and an environment of the user. Additionally, the system may perform an operation that includes obtaining, from the visual content, metadata associated the user and the environment of the user. The system may then perform an operation that includes determining, based on the visual content and metadata, if the user is speaking, and, if the user is determined to be speaking, perform an operation that includes obtaining audio content associated with the user and the environment. Based on the visual content, audio content, and metadata, the system may perform an operation that includes adapting an acoustic model corresponding to the user and the environment. Finally, the system may perform an operation that includes enhancing, by utilizing the acoustic model, a speech recognition process utilized for processing speech of the user.

In another embodiment, a method for sensor enhanced speech recognition is disclosed. The method may include utilizing a memory that stores instructions, and a processor that executes the instructions to perform the various functions of the method. Specifically, the method may include obtaining visual content associated with a user and an environment of the user. Additionally, the method may include obtaining, from the visual content, metadata associated the user and the environment of the user. The method may also include determining, based on the visual content and metadata, if the user is speaking. If the user is determined to be speaking, the method may include obtaining audio content associated with the user and the environment. Furthermore, the method may include adapting, based on the visual content, audio content, and metadata, an acoustic model corresponding to the user and the environment. Moreover, the method may include enhancing, by utilizing the acoustic model, a speech recognition process utilized for processing speech of the user.

According to yet another embodiment, a computer-readable device having instructions for sensor enhanced speech recognition is provided. The computer instructions, which when loaded and executed by a processor, may cause the processor to perform operations including: obtaining visual content associated with a user and an environment of the user; obtaining, from the visual content, metadata associated the user and the environment of the user; determining, based on the visual content and metadata, if the user is speaking; obtaining, if the user is determined to be speaking, audio content associated with the user and the environment; adapting, based on the visual content, audio content, and metadata, an acoustic model corresponding to the user and the environment; and enhancing, by utilizing the acoustic model, a speech recognition process utilized for processing speech of the user.

These and other features of the systems and methods for sensor enhanced speech recognition are described in the following detailed description, drawings, and appended claims.

DETAILED DESCRIPTION OF THE INVENTION

As shown in FIGS. 1-5, systems 100, 300 and accompanying methods for sensor enhanced speech recognition are disclosed. In particular, the systems 100, 300 and methods may use metadata obtained from visual, audio, or other content associated with a user and an environment 114 of the user to adapt and match acoustic models that are used for enhancing speech recognition processes or other processes associated with the user. In order to do so, the systems 100, 300 and methods may include utilizing visual sensors, cameras, audio sensors, or other similar devices to capture visual, audio, or other content associated with the user and the user's environment 114. The captured content and metadata associated with the content may be utilized to determine a distance between the user and a device that the user is using, the user's orientation with respect to the device of the user, a gender of the user, an age of the user, a location of the user, a velocity of the user, or other information associated with the user. Additionally, the captured content, metadata associated with the content, or a combination thereof, may be utilized by the systems 100, 300 and methods to determine if the user is speaking or otherwise making sounds.

Figure 1:
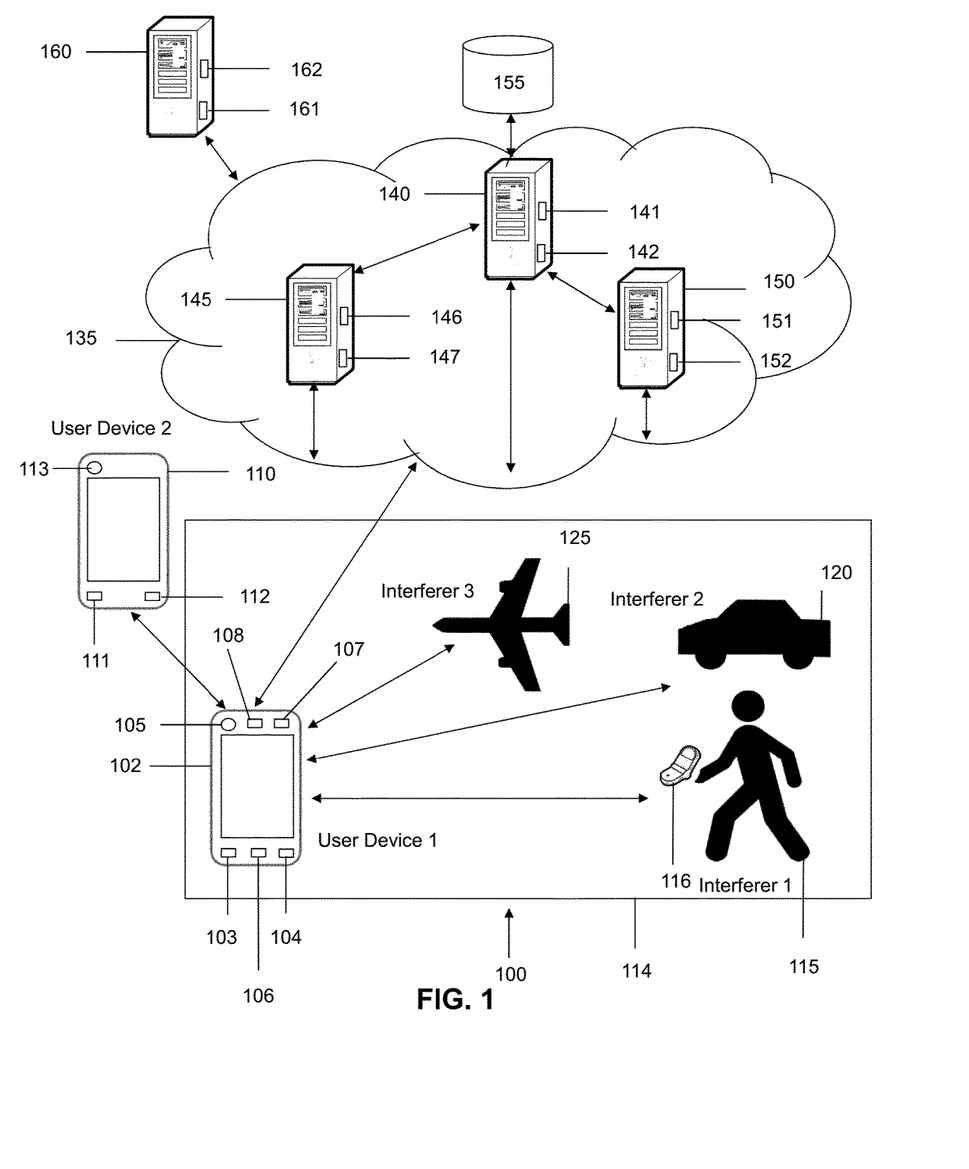
FIG. 1 is a schematic diagram of a system for sensor enhanced speech recognition according to an embodiment of the present disclosure.
Figure 3:
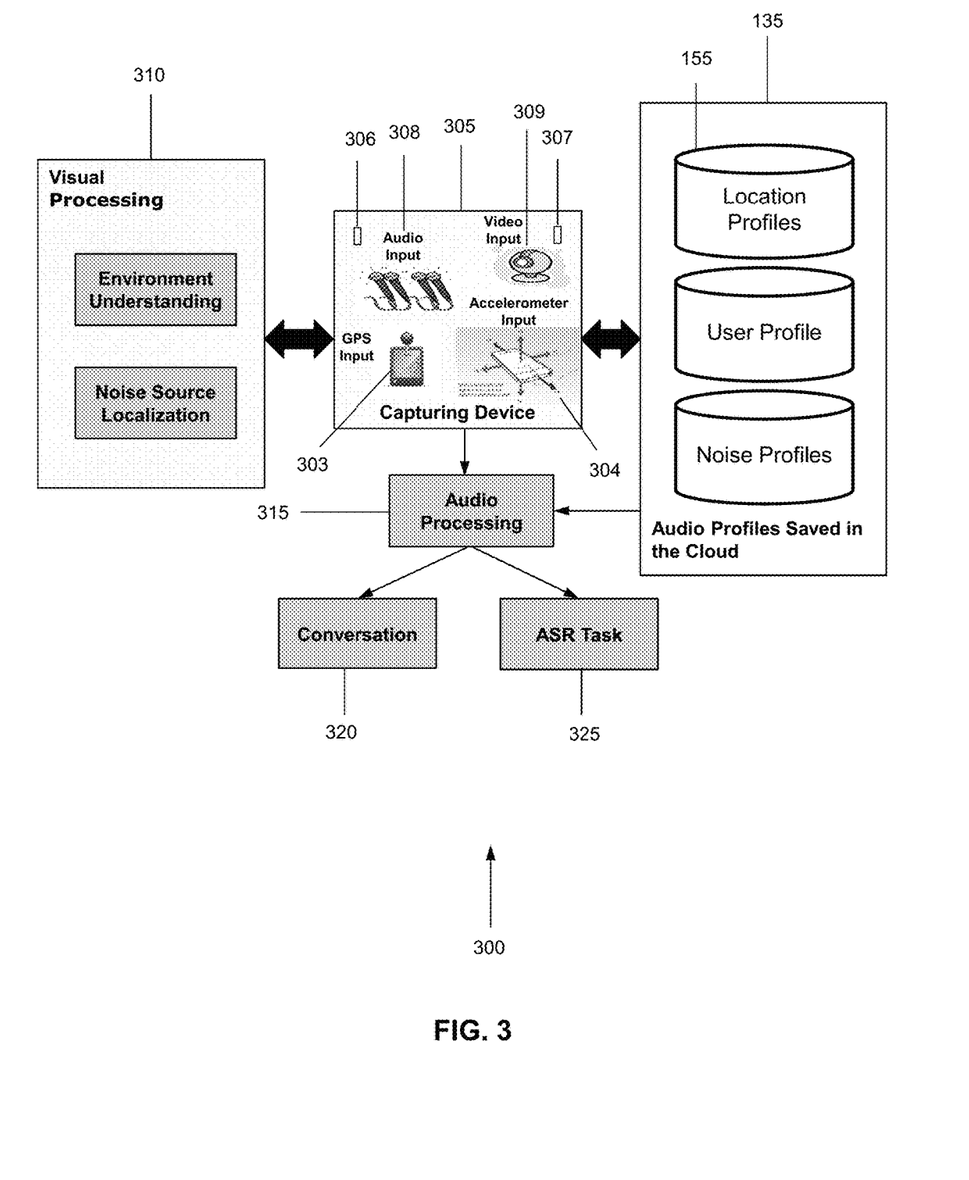
FIG. 3 is a schematic diagram illustrating a sample implementation of a system for sensor enhanced speech recognition according to an embodiment of the present disclosure.

If the user is determined to be speaking or making sounds, the systems 100, 300 and methods may include obtaining audio content associated with the user and the environment 114. Based on the visual content, audio content, metadata, or a combination thereof, the systems 100, 300 and methods may include adapting and loading one or more acoustic models that correspond to or otherwise match the user and the environment of the user. The systems and methods may utilize the loaded acoustic models to enhance a speech recognition process or other process associated with the user. As a result, the systems 100, 300 and methods may ensure an optimal matching between audio conditions occurring in the user's environment with the appropriate acoustic models so as to improve speech recognition processes or other selected processes.

Figure 2:
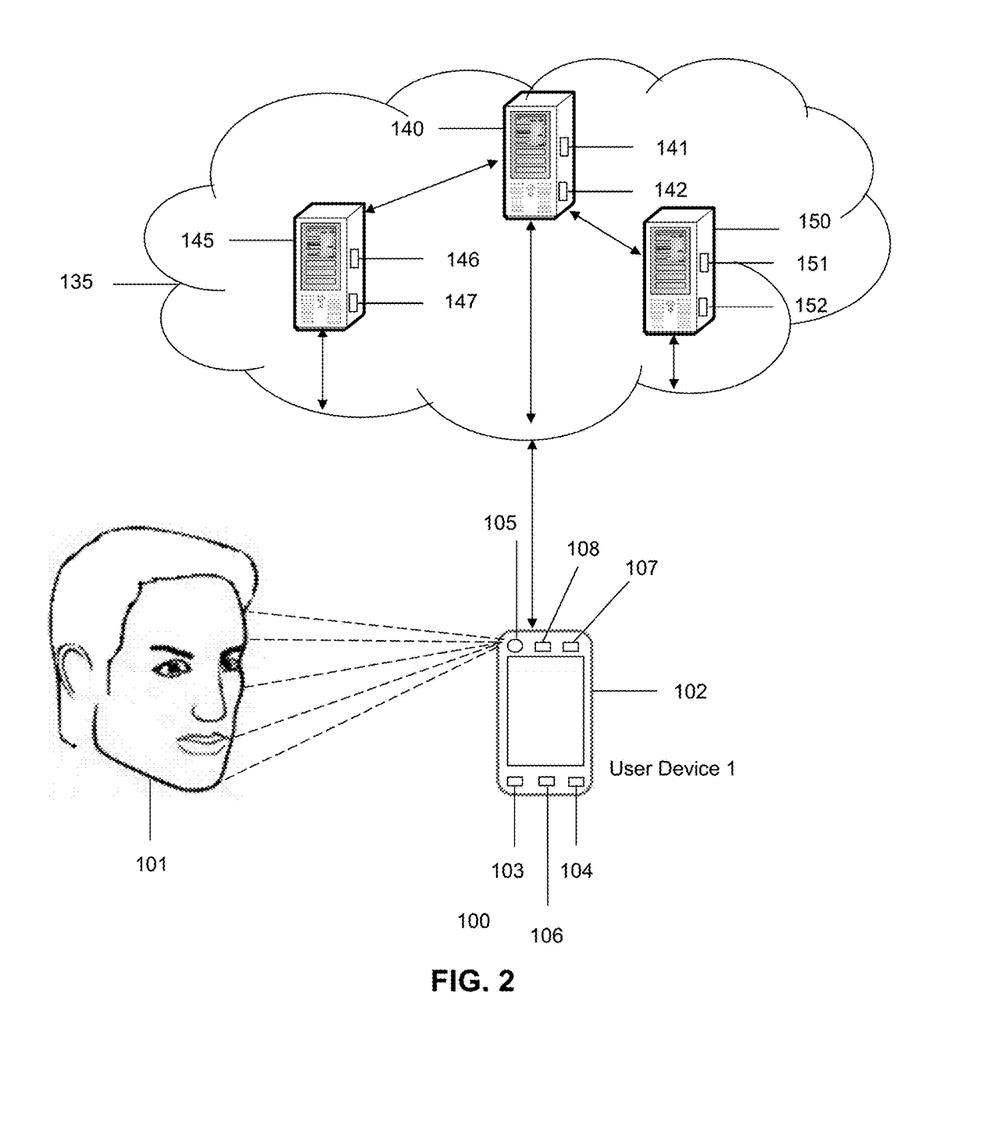
FIG. 2 is a schematic diagram of the system of FIG. 1 that illustrates the capturing of content associated with a user.

As shown in FIGS. 1-2, a system 100 for sensor enhanced speech recognition may be configured to support, but is not limited to supporting, automatic speech recognition services, telephone services, cloud computing services, content delivery services, voice-over-internet protocol services (VoIP), software as a service (SaaS) applications, gaming applications and services, productivity applications and services, mobile applications and services, and any other computing applications and services. The system may include one or more users that may utilize first user device 102 to access and obtain content, data, and services, to interact with speech recognition processes, to participate in communications sessions, or to perform a variety of other functions. As an example, a user may utilize user device 102 to interact with an application that includes a speech recognition process that processes the speech of the user so as to perform a variety of functions for the user. As another example, a user may utilize first user device 102 to participate in a telephone call or other communications session with another user that is using second user device 110.

In certain embodiments, the first user device 102 and second user device 110 may be, but are not limited to being, computers, servers, mobile devices, smartphones, computer tablets, phablets, or any other computing devices. In one embodiment, the first user device 102 may include a memory 103 that includes instructions, and a processor 104 that executes the instructions from the memory 103 to perform various operations that are performed by the first user device 102. The processor 104 may be hardware, software, or a combination thereof. Additionally, the first user device 102 may include a camera 105, which may be utilized to capture video, image, or other content. The first user device 102 may also include an accelerometer 106 that may be utilized to measure a rate of acceleration of the first user device 102. In one embodiment, the rate of acceleration may be utilized by the device 102 to determine an orientation of the first user device 102, along with a gyroscope 108. Furthermore, the first user device may include a global positioning sensor 107 that may be able to provide location information for the first user device 102 and a user using the first user device 102. Similarly, second user device 110 may include a memory 111 that includes instructions, and a processor 112 that executes the instructions from the memory 111 to perform various operations that are performed by the second user device 110. The processor 112 may be hardware, software, or a combination thereof. Additionally, the second user device 110 may include a camera 113, which may be utilized to capture video, image, audio or other content. The first user device 102 and the second user device 110 may also include any type of sensor that can obtain information for the system 100.

A first user and a second user may utilize the first user device 102 and second user device 110 respectively to make telephone calls, or to access and obtain various types of content and services, such as but not limited to, video content, audio content, web content, text content, automatic speech recognition services, or other speech-related services, or any combination thereof. Additionally, the end users may utilize the first user device 102 and second user device 110 to perform a variety of other tasks and functions. In certain embodiments, the first user device 102 and second user device 110 may include a software application that may be an automatic speech recognition application, a cloud-based application, gaming application, an internet-based application, a browser application, a mobile application, a productivity application, a video application, a music application, a social media application, a financial application, a news application, any other type of application, or a combination thereof. In certain embodiments, the application may be utilized to provide de-noising services to the first and second users. In certain embodiments, at least a portion of the software application may be configured to execute directly on the first user device 102 and second user device 110, however, in other embodiments, the software application may be configured to execute on the other devices and components in the system 100.

The first user of the first user device 102 may be in an environment 114, which may be any type of environment, such as, but not limited to, an airport, a stadium, a beach, a park, an office building, a street, a movie theater, or any other type of environment. In certain embodiments, the second user may be in the same environment 114 as the first user, however, in other embodiments, the second user may be in a different environment from the first user. The environment 114 may include ambient noise. The environment 114 may also include one or more interferers, such as, but not limited to, interferer 115, interferer 120, and interferer 125. The interferers 115, 120, 125 may be any type of object, person, or animal that may make noise in the environment 114 that may potentially interfere with communications made by the first user, the second user, or both. In FIG. 1, the environment 114 is an airport, interferer 115 is a person using a smartphone 116, interferer 120 is a car, and interferer 125 is an airplane.

The functionality of the system 100 may be supported and executed by using any combination of the servers 140, 145, and 150 in the communications network 135 or outside of the communications network 135. In one embodiment, the server 140 may include a memory 141 that includes instructions, and a processor 142 that executes the instructions from the memory 141 to perform various operations that are performed by the server 140. Additionally, the server 145 may include a memory 146 that includes instructions, and a processor 147 that executes the instructions from the memory 146 to perform various operations that are performed by the server 145. Furthermore, the server 150 may include a memory 151 that includes instructions, and a processor 152 that executes the instructions from the memory 151 to perform various operations that are performed by the server 150. The processors 142, 147, and 152 may be hardware, software, or a combination thereof. In certain embodiments, the servers 140, 145, and 150 may be network servers, routers, gateways, computers, mobile devices, or any other suitable computing device.

The communications network 135 of the system 100 may be configured to link each of the devices in the system 100 to one another, and be configured to transmit, generate, and receive any information and data traversing the system 100. In one embodiment, the communications network 135 may include any number of additional servers in addition to the server 140, the server 145, and the server 150. The communications network 135 may also include and be connected to a cloud computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. In one embodiment, the communications network 135 may be part of a single autonomous system that is located in a particular geographic region, or be part of multiple autonomous systems that span several geographic regions.

The database 155 of the system 100 may be utilized to store and relay any information that traverses the system 100, cache content that traverses the system 100, store data about each of the devices in the system 100, and perform any other typical functions of a database. In one embodiment, the database 155 may be connected to or reside within the communications network 135. Additionally, the database 155 may include a processor and memory or be connected to a processor and memory to perform the various operation associated with the database 155. In certain embodiments, the database 155 may be connected to servers 140, 145, and 150, server 160, visual processing device 310, capturing device 305, audio processing device 315, first user device 102, second user device 110, or any combination thereof. The database 155 may also store the content obtained from the environment 114, store the metadata obtained from the content, store user profiles, store acoustic models, store information associated with the user, store the user's speech patterns, store communications, store information about the environment 114, store information about the interferers 115, 120, 125, store user preferences, store information traversing the system 100, or any combination thereof. Furthermore, the database 155 may be configured to process queries sent to it by any device in the system 100, system 300, or both.

Operatively, the system 100 may utilize various types of sensors to enhance automatic speech recognition processes, speech-related processes, other processes, an application associated with the user, or a combination thereof. In a first example scenario, the first user may be utilizing an application on the first user device 102 that utilizes automatic speech recognition technologies. For example, the first user may utilize an application on the first user device 102 that takes voice inputs that may be utilized to access various banking services. The first user may be a thirty-year old male located in a park, and the first user may access a voice interface of the application to access the banking services or to perform other actions. Since the first user is located in a park, the automatic speech recognition functions of the application may have difficulty capturing or processing the first user's voice inputs based on the noise conditions in the environment 114. In order to improve the automatic speech recognition capabilities of the application, the system 100 may be activated by the first user or the system 100 may be activated automatically when the first user opens the application or at any other designated time.

Once activated, the system 100 may capture visual content, other content, or a combination thereof, associated with the first user and the first user's environment 114, such as by using the camera 105 of the first user device 102. The visual content may include still image content, video content, or other types of visual content. In addition, the system 100 may obtain additional information associated with the first user and the environment 114 by activating the accelerometer 106, which may be utilized to measure a rate of acceleration of the first user device 102 and of the first user. In one embodiment, the rate of acceleration may be utilized by the device 102 in order to determine an orientation of the first user device 102 in conjunction with the gyroscope 108. Furthermore, the first user device 102 may include a global positioning sensor 107 that may be able to provide location information for the first user device 102 and the first user using the first user device 102.

The system 100 may obtain metadata from the visual content captured from the camera 105, the information gathered from the accelerometer 106, the information gathered from the gyroscope 108, the information gathered from the global positioning sensor 107, other information, or a combination thereof. The metadata may include, but is not limited to, information that indicates a location of the first user, information that indicates the locations of other users and objects in the environment 114, information that indicates if the first user is speaking, information that indicates whether the first user's mouth is open or lips are moving, information that indicates an orientation of the first user with respect to a device that the first user is using, information that indicates a velocity of the first user, information that indicates the first user's distance from device that the first user is using, information that indicates a language of the first user, information that indicates a gender and age of the first user, information that identifies the first user, information that indicates what the first and second users in the environment 114 are doing, information that indicates a type of environment 114, information that indicates the types of devices being used in the environment 114, any other type of information, or a combination thereof. The user's distance from the device that the first user is using may be utilized to influence a ratio of direct/indirect audio signals and levels of reverberation by the system 100. The information that indicates if the first user's mouth is open or lips are moving may be used to determine whether the first user is speaking. The orientation of the first user with respect to the first user device 102 may be utilized in influencing a frequency response of a microphone signal and to improve automatic speech recognition performance.

Based on the visual content captured from the camera 105, the information gathered from the accelerometer 106, the information gathered from the gyroscope 108, the information gathered from the global positioning sensor 107, other information, the metadata, or a combination thereof, the system 100 may be configured to determine if the first user is speaking. For example, the visual content captured from the camera 105 may indicate that the first user's mouth is open, that the first user's lips are moving, or a combination thereof. If the first user is determined to not be speaking by the system 100, the system 100 may continue to capture the visual content and gather the information using the gyroscope 108, the global positioning sensor 107, and the accelerometer. However, if the first user is determined to be speaking, the system 100 may cause the first user device 102 or other selected device of the system to start capturing audio content made by the first user, the first user's environment 114, or a combination thereof. The audio content made by the first user may be the first user's speech, and the audio content of the environment 114 may include ambient noise of the environment 114. By capturing the audio content when the first user is actually speaking, the first user device 102 or other selected device may serve as a voice activity detector or an audio gateway for the system 100. In this way, the amount of audio content without the presence of the desired speech signals generated by the first user may be minimized, and, additionally, any errors due to noise may also be minimized.

Once the audio content is captured, the system 100 may reconstruct the audio and noise conditions associated with the user and the user's environment 114. The system 100 may then retrieve one or more acoustic models corresponding to or matching the first user's speech, the environment 114, or a combination thereof, based on the audio content, the visual content, the metadata, and the information gathered from the gyroscope 108, global positioning sensor 107, and accelerometer 106. The system 100 may further adapt the retrieved acoustic models based on the captured content, metadata, and information gathered so that the acoustic models are tailored to the first user and the first user's environment 114. The acoustic models may include statistical information, audio information, signaling information, and other information corresponding to the audio conditions associated with the user's speech and audio conditions occurring in the environment 114. In the present example, the first user is a thirty-old male in a park attempting to access banking services on an application. As a result, the acoustic models may include audio information conforming to the first user's voice and audio information associated with park noises. Once the acoustic models are adapted by the system 100, the system may utilize the acoustic models to enhance the automatic speech recognition processes of the application being used by the first user, to enhance any other speech-related process, or to enhance an application used by the first user. In the present example, the acoustic models may be utilized to dampen or remove the noises in the park from the automatic speech recognition process, while amplifying and improving the audio signals generated by the user. As a result, the adapted acoustic models may be utilized to ensure that the first user has an optimal experience when using the speech recognition process.

In a second example scenario, the first user of the first user device 102 may be engaging in a communications session, such as a telephone call, with the second user of the second user device 110. The communications session may involve automatic speech recognition processes or other speech related processes. The first user may be driving in a car around an airport at twenty miles per hour, and the user may be positioned two feet from the first user device 102. The airport environment 114 may include ambient noise and noises made by interferers 115, 120, 125 that may interfere with the quality and perceptibility of the communications occurring during the communications session between the first and second users. The system 100 may capture visual content, other content, and information from the accelerometer 106, global positioning sensor 107, and gyroscope 108 that are associated with the user and the user's environment.

Metadata may be obtained from the captured visual content, other content and information. The metadata may include, but is not limited to, information that indicates a location of the first user, information that indicates a time of day that the content was captured by the camera 105, orientation information, the first user's distance from the first user device 102, the first user's age and gender information, the first user's gender, the first user's language, information that indicates the locations of other users and objects in the environment 114, information that identifies the interferers 115, 120, 125, information that indicates the locations of the interferers 115, 120, 125, information for identifying the audio signals made in the environment 114 and interferers 115, 120, 125, information that identifies the user, information that indicates what the users in the environment 114 are doing, information that indicates a type of environment 114, information that indicates the types of devices being used in the environment 114, any other type of information, or a combination thereof.

Based on the metadata, the captured content, and the captured information, the system 100 may determine if the first user is speaking. If the first user is speaking, the system 100 may capture audio content generated by the first user and audio content occurring in environment 114. The captured audio content, visual content, metadata, and information may then be used to generate or adapt one or more acoustic models to be used in enhancing the speech recognition process in the first user's communications session. Once the acoustic models are adapted, the system 100 may apply the acoustic models to the user's communications session so as to ensure that the speech recognition process is operating in such a way that is tailored to the first user and to the first user's current environment. In this case, the acoustic models may be tailored to a thirty-year old male that is in a car moving at twenty miles per hour that is two feet from the first user device 102.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, obtaining visual, audio, or other content associated with the user and the environment of the user, obtaining metadata from the obtained content, determining if the user is speaking based on the visual content and metadata, determining a location of the user based on the metadata, loading an acoustic model based on the visual content, audio content, and metadata, loading a user profile of the user that is associated with the user, enhancing a speech recognition process or other process utilized by the user, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 110, a first interferer 115, a second interferer 120, a third interferer 125, communications network 135, a server 140, a server 145, a server 150, a server 160, and a database 155. However, the system 100 may include multiple first user devices 105, multiple second user devices 110, multiple interferers 115, 120, 125, multiple communications networks 135, multiple servers 140, 145, 150, and 160, multiple databases 155, or any number of any of the other components in the system 100. Furthermore, in one embodiment, substantial portions of the functionality and operations of the system 100 may be performed by other networks and systems that may be connected to system 100, such as system 300.

As shown in FIG. 3, a system 300 for sensor enhanced speech recognition may incorporate and utilize any of the components, devices, and functionality of system 100. In certain embodiments, system 300 may be connected to system 100, such as via the communications network 135. A user of the system 300 may be participating in a communications session involving a conversation 320, an automatic speech recognition process 325, or other speech-involved processes. The system 300 may include a capturing device 305, which may be configured to capture video inputs, audio inputs, or other types of inputs occurring in the environment 114 during the communications session. The capturing device 305 may include a memory 306 configured to store instructions and a processor 307 that is configured to execute the instructions to perform the various operations performed by the capturing device 3205. The capturing device 305 may be configured to obtain visual content, audio content, or other content, such as by utilizing microphone 308 and one or more cameras 309. In certain embodiments, the microphone 308 may be embodied as a microphone array. Additionally, the capturing device 305 may include an accelerometer 304 that may have similar functionality as accelerometer 106, and may include a global positioning sensor 303, which may have similar functionality as global positioning sensor 107.

The system 300 may obtain visual content, other content, or a combination thereof, associated with the user and the user's environment 114. The visual content, other content, or a combination thereof captured by the capturing device 305 may be processed by the visual processing device 310. The visual processing device 310 may be hardware, software, or a combination thereof. When the visual processing device 310 processes the visual content or other content, the visual processing device 210 may obtain metadata from the visual content or other content so as to provide the system 300 with information pertaining to the user and the environment 114. The metadata may include, but is not limited to, information that indicates a location of the user, information that indicates the locations of other users and objects in the environment 114, information that indicates if the user is speaking, information that indicates whether the user's mouth is open or lips are moving, information that indicates an orientation of the user with respect to a device that the user is using, information that indicates a velocity of the user, information that indicates the user's distance from device that the user is using, information that indicates a language of the user, information that indicates a gender and age of the user, information that identifies the user, information that indicates what the users in the environment 114 are doing, information that indicates a type of environment 114, information that indicates the types of devices being used in the environment 114, any other type of information, or a combination thereof.

Based on the visual content and metadata, the system 300 may determine whether the user is speaking. If the user is not speaking, the system 300 may prevent the obtaining of audio content associated with the user and the environment. However, if the user is speaking, the system 300 may obtain audio content associated with the user and the environment. The visual content, audio content, other content, metadata, or a combination thereof, may be utilized by the system 300 to generate or adapt one or more acoustic models corresponding to the user, the environment, or a combination thereof. For example, if the user is a twenty-five year old female in a sports stadium, the system 300 may adapt acoustic models so that they are tailored to a twenty-file year old female in a sports stadium. Additionally, one or more acoustic models may be adapted based on audio profiles, user profiles, and location profiles, such as those described in the method section below. Once the acoustic models are adapted, the system 300 may load the acoustic models and enhance a speech recognition process or other selected process based on the loaded acoustic models. Notably, the system 300 may also incorporate any of the functions and features described for system 100 and the method 400 described herein.

Although FIG. 3 illustrates specific example configurations of the various components of the system 300, the system 300 may include any configuration of the components, which may include using a greater or lesser number of the components. For example, the system 300 is illustratively shown as including a capturing device 305, a visual processing device 310, an audio processing device 315 and a communications network 135. However, the system 300 may include multiple capturing devices 305, multiple visual processing devices 310, multiple audio processing devices 315, multiple communications networks 135 or any number of any of the other components in the system 300. Furthermore, in one embodiment, substantial portions of the functionality and operations of the system 300 may be performed by other networks and systems that may be connected to system 300, such as system 100.

Figure 4:
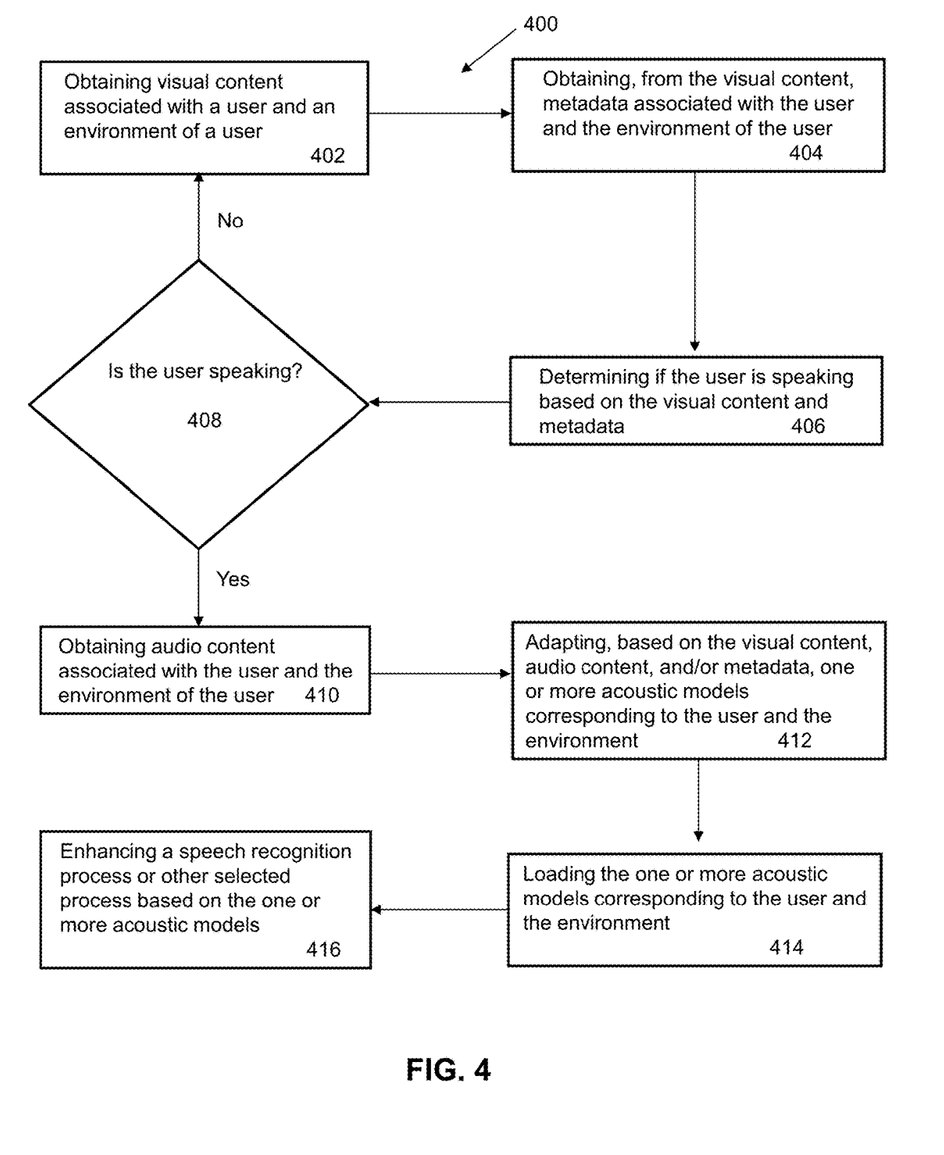
FIG. 4 is a flow diagram illustrating a sample method for sensor enhanced speech recognition according to an embodiment of the present disclosure.

As shown in FIG. 4, an exemplary method 400 for sensor enhanced speech recognition is schematically illustrated, and may include, at step 402, obtaining visual content, other content or any combination thereof, for an environment 114 of a user, such as during a communications session of the user. In one embodiment, the obtaining of the content may be performed by the first user device 102, the second user device 110, the capturing device 305, any combination thereof, or by any other appropriate device. At step 404, the method 400 may include obtaining metadata from the visual content, other content, or any combination thereof. The metadata may include, but is not limited to, information that indicates a location of the user, information that indicates the locations of other users and objects in the environment 114, information that indicates if the user is speaking, information that indicates whether the user's mouth is open, information that indicates an orientation of the user with respect to the first user device 102 or second user device 110, information that indicates a velocity of the user, information that indicates the user's distance from the first user device 102 or second user device 110, information that indicates a language of the user, information that indicates a gender and age of the user, information that identifies the user, information that indicates what the users in the environment 114 are doing, information that indicates a type of environment 114, information that indicates the types of devices being used in the environment 114, any other type of information or a combination thereof.

At step 406, the method 400 may include determining if the user is speaking based on the visual content, other content, metadata or a combination thereof. In certain embodiments, the determination of whether the user is speaking may be performed by the first user device 102, the second user device 110, the capturing device 305, the visual processing device 310, the audio processing device 315, the servers 140, 145, 150, 160, any combination thereof or by any other appropriate device. At step 408, the method 400 may include determining if the user has been speaking. If the user is determined to not be speaking, the method 400 may include going back to step 402 to obtain visual content associated with the user and the environment 114 of the user until the user is determined to be speaking. If, however, the user is determined to be speaking, the method 400 may include, at step 410, obtaining audio content associated with the user and the environment 114 of the user. In certain embodiments, the audio content may be obtained by using the first user device 102, the second user device 110, the capturing device 305, the visual processing device 310, the audio processing device 315, the servers 140, 145, 150, 160, any combination thereof, or by any other appropriate device.

At step 412, the method 400 may include adapting, based on the visual content, audio content, other content, metadata, or a combination thereof, one or more acoustic models that correspond to or match the user and the environment 114 of the user. In certain embodiments, the method 400 may include generating the acoustic models. The acoustic models may be statistical models that may include, but are not limited to, audio information corresponding to a voice, language, age, gender, ethnicity, or a combination thereof, of the user, audio information corresponding to the audio detected in the environment 114, audio signaling information for enhancing speech recognition processes or other processes, algorithms for enhancing speech recognition processes or other processes, or any other type of information. By adapting the acoustic models, the acoustic models may be tailored to the user and to the environment of the user. In certain embodiments, the adapting of the acoustic models may be performed by the first user device 102, the second user device 110, the capturing device 305, the visual processing device 310, the audio processing device 315, the servers 140, 145, 150, 160, any combination thereof, or by any other appropriate device.

At step 414, the method 400 may include loading the one or more acoustic models that correspond with the user and the environment 114 of the user. In certain embodiments, the loading of the acoustic models may be performed by the first user device 102, the second user device 110, the capturing device 305, the visual processing device 310, the audio processing device 315, the servers 140, 145, 150, 160, any combination thereof, or by any other appropriate device. Once the acoustic models are loaded, the method 400 may include, at step 416, enhancing a speech recognition process or other selected process based on the loaded acoustic models. For example, if the user is using an application on the first user device 102 that involves an interactive voice interface that utilizes automatic speech recognition processes, the acoustic models may be applied to the automatic speech recognition processes so as to ensure that voice inputs inputted by the user are of the highest quality. It is important to note that the method described above may incorporate any of the functionality, devices, and/or features of the system 100, system 300, and subsystems described above, or otherwise, and are not intended to be limited to the description or examples provided herein.

Notably, the system 100, system 300, and methods disclosed herein may include additional functionality and features. For example, the system 100, 300, and methods may include utilizing creating a user profile that may include information associated with the user, such as, but not limited to, a name of the user, the user's age, the user's demographic information, an acoustic dictionary corresponding to the user, the user's ethnicity, the user's physical characteristics, and any other information associated with the user or otherwise. Additionally, the user profile may include the user's network usage habits, such as, but not limited to, what type of data plan the user has, what type of network services the user is authorized to access, what type of content the user accesses, when the user typically usage network resources, or any other type of network usage information. The user profile may also include information related to the voice characteristics of the user, such as, but not limited to the user's accent, the user's tone, the user's pitch, the user's speech patterns, the user's languages, or any other information associated with the user's voice. In certain embodiments, the user profile may be loaded by using the first user device 102, the second user device 110, the capturing device 205, the visual processing device 210, the audio processing device 215, the servers 140, 145, 150, 160, any combination thereof, or by any other appropriate device. Once loaded, the user profile may be utilized to adapt various acoustic models and may be utilized to enhance speech recognition processes that the user is accessing. Additionally, the user profiles may be utilized to enhance a user interface of an application used by the user, or to adjust the features of any type of application that the user may be using. For example, if the user is a thirty-year old male that speaks Greek, the visual and audio aspects of the interface may be changed to be tailored to reflect the Greek language and to include features and options that are typically associated with a male.

Additionally, the systems 100, 300 and methods may include the use of audio profiles, which may include audio information, signaling information, noise suppression algorithm information, noise cancellation information, or other information that corresponds to the noise conditions typically found in the environment 114. Similarly, audio profiles corresponding to the interferers 115, 120, 125 may also be retrieved and may include audio information, signaling information, noise cancellation information, or other information corresponding to the interferers 115, 120, 125 and the noise conditions made by the interferers 115, 120, 125. Additionally, the systems 100, 300 may also include location profiles may include audio information, location information, or other information specific to a particular location of the user. The audio profiles and location profiles may be utilized to adapt the acoustic models and to adjust any application that the user is using.

Furthermore, the systems 100, 300 and methods may include obtaining the video content, audio content, other content, and metadata by utilizing any type of sensor, such as, but not limited to, any visual sensor, any acoustic sensor, any recording device, any light sensor, an accelerometer, a global positioning sensor, any other type of sensor, or a combination thereof. Additionally, in certain embodiments, the user profile and acoustic models, or a combination thereof, may be retrieved by utilizing a cloud-based application configured to execute on the first user device 102, the second user device 110, the capturing device 305, the servers 140, 145, 150, 160, any combination thereof, or by any other appropriate device. The cloud-based application may retrieve the acoustic models and user profiles via the communications network 135, which may be a cloud-based network. In certain embodiments, the acoustic models and user profiles may be updated based on the visual content, audio, content, other content, metadata, or a combination thereof, obtained by the systems 100, 300. For example, if metadata obtained for the environment 114 indicates that the user is in a train station environment, the acoustic model associated with the train station environment may be adapted to the specific conditions for that particular train station environment. In certain embodiments, the acoustic models, user profiles, location profiles, and audio profiles may be stored in a library residing on the database 155 and may be updated as new content is captured in the system 100.

Moreover, the system 100, system 300, and methods are not intended to be limited to enhancing speech recognition processes, but may also be utilized for enhancing anything associated with the user. For example, the metadata, captured content, and captured information may be used to adapt a user interface that the user is using to reflect the user's interests, location, and characteristics. Also, any application utilized by the user may be adapted based on the metadata, captured content, and captured information. For example, if the user is surfing the internet while located in an airport, the system 100, system 300, and methods may include displaying an advertisement on the first user device 102 for purchasing a plane ticket. In certain embodiments, the metadata, content, and information may also be utilized to track the user's behavior and the types of environments 114 that the user typically is located in.

Figure 5:
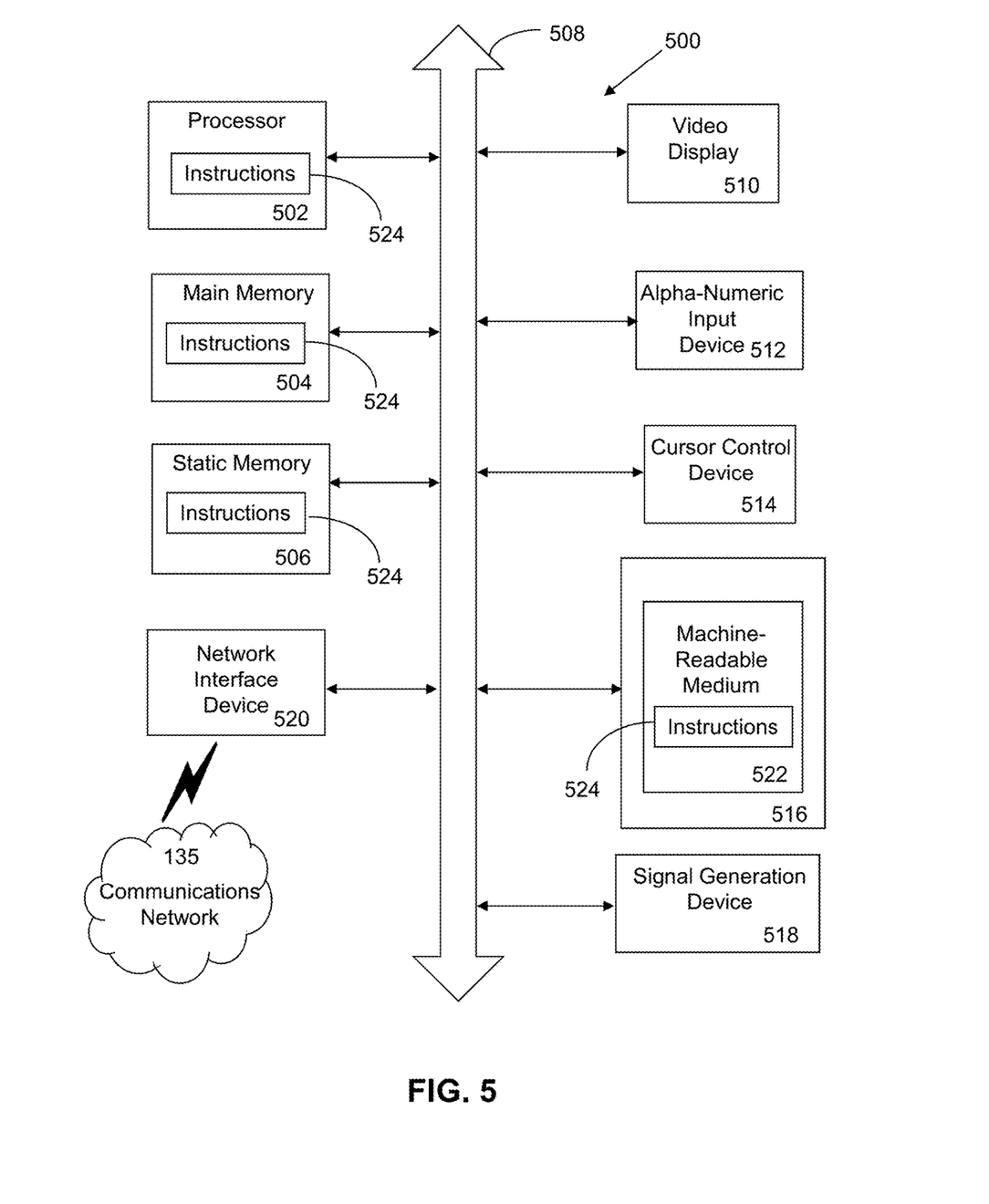
FIG. 5 is a schematic diagram of a machine in the form of a computer system within which a set of instructions, when executed, may cause the machine to perform any one or more of the methodologies or operations of the systems and methods for sensor enhanced speech recognition.

As shown in FIG. 5, at least a portion of the methodologies and techniques described with respect to the exemplary embodiments of the system 100 and system 300 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100 and the system 300. For example, the machine may be configured to, but is not limited to, assist the system 100 and the system 300 by providing processing power to assist with processing loads experienced in the system 100 and the system 300, by providing storage capacity for storing instructions or data traversing the system 100 and the system 300, or by assisting with any other operations conducted by or within the system 100 and the system 300.

In some embodiments, the machine may operate as a standalone device. In some embodiments, the machine may be connected (e.g., using communications network 135, another network, or a combination thereof) to and assist with operations performed by other machines, such as, but not limited to, the first user device 102, the second user device 110, the server 140, the server 145, the server 150, the database 155, the server 160, the capturing device 305, the visual processing device 310, the audio processing device 315, or any combination thereof. The machine may be connected with any component in the system 100, system 300, or a combination thereof. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 522 containing instructions 524 so that a device connected to the communications network 135, other network, or both, can send or receive voice, video or data, and to communicate over the communications network 135, other network, or both, using the instructions. The instructions 524 may further be transmitted or received over the communications network 135, other network, or both, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a signal wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions;
   a processor that executes the instructions to perform operations, the operations comprising:
   obtaining, from visual content, metadata associated with a user and an environment of the user;
   identifying, based on the visual content and the metadata, an interferer and a location of the interferer in the environment;
   obtaining audio content associated with the user and the environment;
   enhancing a speech recognition process utilized for processing speech of the user that is within the audio content;
   cancelling, after identifying the interferer and the location of the interferer in the environment and by utilizing an audio profile corresponding to the interferer, noise generated by the interferer that interferes with the speech of the user; and adjusting, based on a user profile of the user and a location profile corresponding to a location of the user, a feature of an application executing the speech recognition process so as to tailor the application to the user, wherein adjusting the feature of the application comprises adjusting at least an audio feature of the application based on the user profile and the location profile.

2. The system of claim 1, wherein the operations further comprise obtaining the visual content associated with the user and the environment of the user.

3. The system of claim 1, wherein the operations further comprise determining, based on the visual content or the metadata, if the user is speaking.

4. The system of claim 1, wherein the operations further comprise determining, based on the visual content and the metadata, a type of a first device being utilized in the environment.

5. The system of claim 4, wherein the operations further comprise adapting an acoustic model corresponding to the user and the environment based on the visual content, the audio content, the metadata, and the type of the first device being utilized in the environment.

6. The system of claim 5, wherein the operations further comprise enhancing, by utilizing the acoustic model, the speech recognition process utilized for processing the speech of the user that is within the audio content.

7. The system of claim 1, wherein the operations further comprise determining, based on the visual content and the metadata, a distance between a first device being utilized in the environment and the user.

8. The system of claim 7, wherein the operations further comprise adjusting, based on the distance between the first device and the user, a ratio of direct to indirect audio signals occurring in the environment and a level of reverberation associated with the audio content in the environment.

9. The system of claim 1, wherein the operations further comprise adapting, based on the user profile of the user, a user interface of the application executing the speech recognition process utilized for processing the speech of the user, wherein the user interface is adapted based on the visual content, the audio content, the metadata, or a combination thereof.

10. The system of claim 9, wherein the operations further comprise adapting the user interface of the application by enhancing a visual aspect of the user interface itself to reflect a characteristic of the user, the location of the user, an interest of the user, or a combination thereof.

11. The system of claim 1, wherein the operations further comprise determining an orientation of a face of the user with respect to a device utilized by the user, and wherein the operations further comprise adapting an acoustic model based on the orientation of the face of the user with respect to the device.

12. The system of claim 1, wherein the operations further comprise creating the user profile of the user based on the metadata.

13. The system of claim 1, wherein the operations further not obtaining the audio content associated with the user and the environment if the user is determined to not be speaking.

14. A method, comprising:

extracting, from visual content, metadata associated with a user and an environment of the user;

detecting, based on the visual content and the metadata, an interferer and a location of the interferer in the environment;

obtaining audio content associated with the user and the environment;

enhancing a speech recognition process utilized for processing speech of the user that is within the audio content, wherein the enhancing is performed by utilizing instructions from a memory that are executed by a processor;

cancelling, after identifying the interferer and the location of the interferer in the environment and by utilizing an audio profile corresponding to the interferer, noise generated by the interferer that interferes with the speech of the user; and modifying, based on a user profile of the user and a location profile corresponding to a location of the user, a feature of an application executing the speech recognition process so as to tailor the application to the user, wherein modifying the feature of the application comprises modifying at least an audio feature of the application based on the user profile and the location profile.

15. The method of claim 14, further comprising determining, based on the visual content and metadata, a language being spoken by the user, and wherein the operations further comprise adapting an acoustic model utilized to enhance the speech recognition process based on the language being spoken by the user.

16. The method of claim 14, further comprising determining a velocity of the user, and wherein the operations further comprise adapting an acoustic model utilized to enhance the speech recognition process based on the velocity of the user.

17. The method of claim 14, further comprising determining the location of the user based on the metadata.

18. The method of claim 17, further comprising adapting an acoustic model utilized to enhance the speech recognition process based on the location of the user.

19. The method of claim 14, further comprising determining an age of the user based on the visual content and the metadata, and further comprising adapting an acoustic model utilized to enhance the speech recognition process based on the age.

20. The method of claim 14, further comprising creating the user profile of the user based on the metadata, and further comprising adapting an acoustic model utilized to enhance the speech recognition process based on the user profile.

21. A non-transitory computer-readable device comprising instructions, which when executed by a processor, cause the processor to perform operations comprising:

extracting, from visual content, metadata associated with a user and an environment of the user;

identifying, based on the visual content and the metadata, an interferer and a location of the interferer in the environment;

capturing audio content associated with the user and the environment;

enhancing a speech recognition process utilized for processing speech of the user that is within the audio content;

cancelling, after identifying the interferer and the location of the interferer in the environment and by utilizing an audio profile corresponding to the interferer, noise generated by the interferer that interferes with the speech of the user; and modifying, based on a user profile of the user and a location profile corresponding to a location of the user, a feature of an application executing the speech recognition process so as to tailor the application to the user, wherein modifying the feature of the application comprises modifying at least an audio feature of the application based on the user profile and the location profile.

* * * * *